(12) United States Patent
Wu et al.

(10) Patent No.: US 11,412,024 B2
(45) Date of Patent: Aug. 9, 2022

(54) METHOD AND APPARATUS FOR DETERMINING ACCESS PATH OF CONTENT DELIVERY NETWORK

(71) Applicant: Beijing Baidu Netcom Science and Technology Co., Ltd., Beijing (CN)

(72) Inventors: Yongqiang Wu, Beijing (CN); Yixing Sun, Beijing (CN); Tai Wang, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 0 days.

(21) Appl. No.: 16/675,810

(22) Filed: Nov. 6, 2019

(65) Prior Publication Data

US 2020/0304555 A1 Sep. 24, 2020

(30) Foreign Application Priority Data

Mar. 18, 2019 (CN) .......................... 201910204810.1

(51) Int. Cl.
*H04L 65/80* (2022.01)
*H04L 47/125* (2022.01)
(Continued)

(52) U.S. Cl.
CPC ............ *H04L 65/80* (2013.01); *H04L 47/125* (2013.01); *H04L 47/24* (2013.01);
(Continued)

(58) Field of Classification Search
CPC ....... H04L 65/80; H04L 47/125; H04L 47/24; H04L 65/4069; H04L 67/1008;
(Continued)

(56) References Cited

U.S. PATENT DOCUMENTS 10,225,365 B1 * 3/2019 Hotchkies ........... H04L 67/2842
2011/0099259 A1 4/2011 Lyon
(Continued)

FOREIGN PATENT DOCUMENTS

CN 104954219 A 9/2015
CN 106656800 A 5/2017
(Continued)

*Primary Examiner* — Brian Whipple
*Assistant Examiner* — James Ross Hollister
(74) *Attorney, Agent, or Firm* — Nixon Peabody LLP

(57) ABSTRACT

Embodiments of the present disclosure relate to a method, apparatus, electronic device for determining an access path of a content delivery network, and a computer readable medium. A method may include: acquiring, in response to determining that an edge node receiving a user request fails to cache a requested resource, access performance information of each node in the content delivery network, and determining a target path from the edge node receiving the user request via a preset node corresponding to a requested target source station in the content delivery network to the target source station based on the access performance information of the each node in the content delivery network, where the preset node pre-establishes a connection with the requested target source station, and a distance between the preset node and the target source station meets a preset distance condition.

13 Claims, 4 Drawing Sheets

(51) Int. Cl.
*H04L 47/24* (2022.01)
*H04L 65/61* (2022.01)
*H04L 67/1008* (2022.01)
*H04L 67/101* (2022.01)
*H04L 67/141* (2022.01)
*H04L 67/5681* (2022.01)
*H04L 69/40* (2022.01)

(52) U.S. Cl.
CPC ........ *H04L 65/4069* (2013.01); *H04L 67/101* (2013.01); *H04L 67/1008* (2013.01); *H04L 67/141* (2013.01); *H04L 67/2847* (2013.01); *H04L 69/40* (2013.01)

(58) Field of Classification Search
CPC . H04L 67/101; H04L 67/141; H04L 67/2847; H04L 69/40; H04L 67/1097; H04L 67/2842; H04L 45/127; H04L 45/02; H04L 67/1002; H04L 67/1012; H04L 67/1029
See application file for complete search history.

(56) References Cited

U.S. PATENT DOCUMENTS

| | | | | |
|---|---|---|---|---|
| 2011/0196943 | A1* | 8/2011 | Bornstein | H04L 45/26 709/219 |
| 2011/0261722 | A1* | 10/2011 | Awano | H04L 45/745 370/254 |
| 2016/0204990 | A1* | 7/2016 | Shattil | H04L 67/101 370/252 |
| 2016/0261493 | A1* | 9/2016 | Li | H04L 43/50 |
| 2017/0171344 | A1* | 6/2017 | Li | H04L 67/327 |
| 2018/0316746 | A1* | 11/2018 | Shattil | H04L 41/147 |
| 2019/0182351 | A1* | 6/2019 | Chen | H04L 43/0852 |
| 2020/0120012 | A1* | 4/2020 | Meredith | H04L 45/123 |

FOREIGN PATENT DOCUMENTS

| | | |
|---|---|---|
| CN | 106716937 A | 5/2017 |
| CN | 108769097 A | 11/2018 |
| CN | 109412946 A | 3/2019 |

* cited by examiner

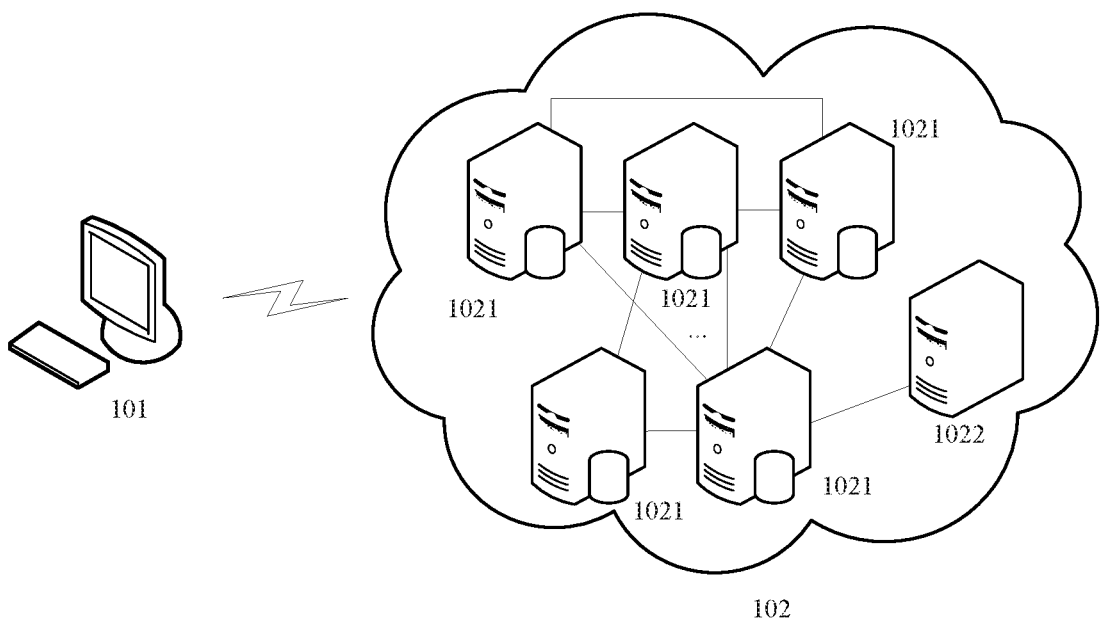

Fig. 1

Acquiring, in response to determining that an edge node receiving a user request fails to cache a requested resource, access performance information of each node in a content delivery network — 201

Determining a target path from the edge node receiving the user request via a preset node corresponding to a requested target source station in the content delivery network to the target source station based on the access performance information of the each node in the content delivery network — 202

Fig. 2

METHOD AND APPARATUS FOR DETERMINING ACCESS PATH OF CONTENT DELIVERY NETWORK

This application claims priority to Chinese Patent Application No. 201910204810.1, filed on Mar. 18, 2019, titled "Method and apparatus for determining access path of content delivery network," which is hereby incorporated by reference in its entirety.

TECHNICAL FIELD

Embodiments of the present disclosure relate to the field of computer technology, specifically to the field of content delivery, and more specifically to a method and apparatus for determining an access path of a content delivery network.

BACKGROUND

The CDN (Content Delivery Network) is usually provided with a plurality of edge nodes located in different regions and belonging to different operators. When a user requests a resource, if one of the edge nodes does not cache the resource, then the edge node will return to a user source station to acquire the source, thus speeding up acquiring the resource in a given region.

When different nodes of a plurality of regions need to return to the source station, a very high pressure will be caused to the source station. To solve this problem, a content delivery network architecture including a center node is presented. When the user requests access to a resource, if the edge node misses a cache, then the edge node returns to a preset center node of the source station, and then the center node returns to the user source station, thus solving the pressure problem of the user source station. A single center node may be provided to effectively achieve convergence of return to the source station, but is limited by factors, such as computer room location, node exit bandwidth, and operator network access, and is difficult to guarantee the quality of return to the source station. However, a plurality of center nodes does not contribute to request convergence, which is hard to achieve convergence of return to the source station.

SUMMARY

Embodiments of the present disclosure provide a method, apparatus, electronic device for determining an access path of a content delivery network, and a computer readable medium.

In a first aspect, an embodiment of the present disclosure provides a method for determining an access path of a content delivery network, including: acquiring, in response to determining that an edge node receiving a user request fails to cache a requested resource, access performance information of each node in the content delivery network; and determining a target path from the edge node receiving the user request via a preset node corresponding to a requested target source station in the content delivery network to the target source station based on the access performance information of the each node in the content delivery network, where the preset node pre-establishes a connection with the requested target source station, and a distance between the preset node and the target source station meets a preset distance condition.

In some embodiments, the determining a target path from the edge node receiving the user request via a preset node corresponding to a requested target source station in the content delivery network to the target source station based on the access performance information of the each node in the content delivery network includes: executing following path searching with the edge node as a starting point of a determined path segment, and the edge node as a starting current node: selecting a node with access performance information meeting a preset performance condition and not being on the determined path segment from nodes connected to the current node for use as a next node of the current node, connecting the next node of the current node to the determined path segment, determining whether the next node of the current node is the preset node corresponding to the requested target source station, switching, in response to that the next node of the current node is not the preset node corresponding to the requested target source station, the next node of the current node to a new current node, and executing the path searching; and determining, in response to that the next node of the current node is the preset node corresponding to the requested target source station, a determined path segment formed by the connecting for use as the target path.

In some embodiments, the path searching further includes: combining an identifier of the current node into the user request.

In some embodiments, the selecting a node with access performance information meeting a preset performance condition and not being on the determined path segment from nodes connected to the current node for use as a next node of the current node includes: determining a node on the determined path segment based on a node identifier contained in the user request received by the current node, and selecting a node not being on the determined path segment from the nodes connected to the current node and with the access performance information meeting the preset performance condition for use as the next node of the current node.

In some embodiments, the access performance information includes: at least one item of delay information, availability information, or node load information, and at least one item of available bandwidth, or cost per unit of data traffic.

In a second aspect, an embodiment of the present disclosure provides an apparatus for determining an access path of a content delivery network, including: an acquiring unit configured to acquire, in response to determining that an edge node receiving a user request fails to cache a requested resource, access performance information of each node in the content delivery network; and a path searching unit configured to determine a target path from the edge node receiving the user request via a preset node corresponding to a requested target source station in the content delivery network to the target source station based on the access performance information of the each node in the content delivery network, where the preset node pre-establishes a connection with the requested target source station, and a distance between the preset node and the target source station meets a preset distance condition.

In some embodiments, the path searching unit is further configured to determine a target path from the edge node receiving the user request via a preset node corresponding to a requested target source station in the content delivery network to the target source station by: executing following path searching with the edge node as a starting point of a determined path segment, and the edge node as a starting current node: selecting a node with access performance information meeting a preset performance condition and not being on the determined path segment from nodes connected to the current node for use as a next node of the current node, connecting the next node of the current node to the determined path segment, determining whether the next node of the current node is the preset node corresponding to the requested target source station, switching, in response to that the next node of the current node is not the preset node corresponding to the requested target source station, the next node of the current node to a new current node, and executing the path searching; and determining, in response to that the next node of the current node is the preset node corresponding to the requested target source station, a determined path segment formed by the connecting for use as the target path.

In some embodiments, the path searching unit is further configured to combine an identifier of the current node into the user request when performing the path searching.

In some embodiments, the path searching unit is further configured to select the node with the access performance information meeting the preset performance condition and not being on the determined path segment from nodes connected to the current node for use as a next node of the current node by: determining a node on the determined path segment based on a node identifier contained in the user request received by the current node, and selecting a node not being on the determined path segment from the nodes connected to the current node and with the access performance information meeting the preset performance condition for use as the next node of the current node.

In some embodiments, the access performance information includes: at least one item of delay information, availability information, or node load information, and at least one item of available bandwidth, or cost per unit of data traffic.

In a third aspect, an embodiment of the present disclosure provides an electronic device, including: one or more processors; and a storage apparatus configured to store one or more programs, where the one or more programs, when executed by the one or more processors, cause the one or more processors to implement the method for determining an access path of a content delivery network according to the first aspect.

In a fourth aspect, an embodiment of the present disclosure provides a computer readable medium, storing a computer program thereon, where the program, when executed by a processor, implements the method for determining an access path of a content delivery network according to the first aspect.

The method and apparatus for determining an access path of a content delivery network in the above embodiments of the present disclosure acquire, in response to determining that an edge node receiving a user request fails to cache a requested resource, access performance information of each node in the content delivery network, and then determine a target path from the edge node receiving the user request via a preset node corresponding to a requested target source station in the content delivery network to the target source station based on the access performance information of the each node in the content delivery network, where the preset node pre-establishes a connection with the requested target source station, and a distance between the preset node and the target source station meets a preset distance condition, thereby achieving returning to the source station once via the preset node corresponding to the target source station on the premise of ensuring the access performance, and contributing to improving the quality of return to the source station.

BRIEF DESCRIPTION OF THE DRAWINGS

After reading detailed description of non-limiting embodiments with reference to the following accompanying drawings, other features, objectives and advantages of the present disclosure will become more apparent.

FIG. 1 is an architectural diagram of an exemplary system in which embodiments of the present disclosure may be applied;

FIG. 2 is a flowchart of a method for determining an access path of a content delivery network according to an embodiment of the present disclosure;

DETAILED DESCRIPTION OF EMBODIMENTS

Figure 3:
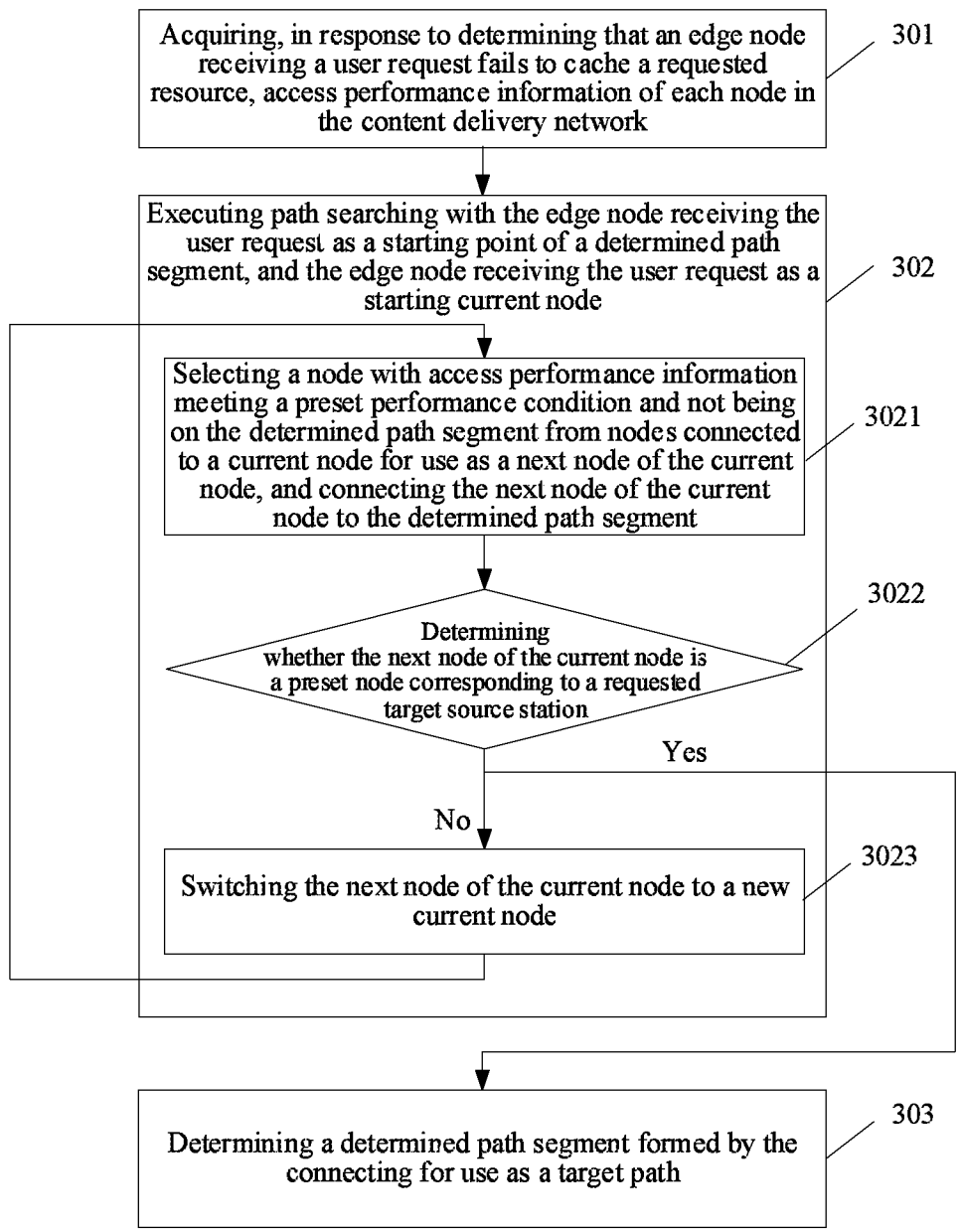
FIG. 3 is a flowchart of the method for determining an access path of a content delivery network according to another embodiment of the present disclosure.

The present disclosure will be further described below in detail in combination with the accompanying drawings and the embodiments. It should be understood that the specific embodiments described herein are merely used for explaining the relevant disclosure, rather than limiting the disclosure. In addition, it should be further noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

FIG. 1 shows an exemplary system architecture in which a method for determining an access path of a content delivery network or an apparatus for determining an access path of a content delivery network of embodiments of the present disclosure may be applied.

As shown in FIG. 1, the system architecture 100 may include a user client 101 and a content delivery network 102. The content delivery network 102 includes a plurality of node servers 1021 and a source station server 1022. The node server 1021 may include an edge node server, which may be a node connected to the user client 101. The source station server 1022 may be a node server for providing the user client 101 with content requested for access. Different edge node servers are connected to corresponding different user clients 101. The node servers 1021 may be connected to each other via a network. The source station server 1022 may alternatively be connected to a part of node servers 1021 via the network.

The user client 101 may initiate a resource access request to an edge node server connected to the user client via the network. The edge node server may find a resource requested for access in a local cache. When failing to find the resource requested for access in the local cache, the edge node server may initiate a request to other node servers 1021, establish a connection with the source station server 1022 via the other node servers 1021, or initiate a resource acquisition request directly to the requested source station server 1022. Other node servers 1021 or the source station server 1022 may send a resource in response to the received request.

In an application scenario of the embodiments of the present disclosure, a content delivery network architecture may include a communication state monitoring module. The communication state monitoring module may be deployed on a node server 1021 of the content delivery network, or be deployed on a plurality of node servers 1021 in the content delivery network by a distributed approach. The communication state monitoring module may be configured to maintain an access performance information table between the node servers 1021, and search a path with best performance based on the access performance information table when finding a path returning to the source station.

It should be noted that the method for determining an access path of a content delivery network according to the embodiments of the present disclosure may be executed by the node server 1021. Accordingly, the apparatus for determining an access path of a content delivery network may be provided in the node server 1021.

It should be understood that the numbers of user clients, node servers, and source station servers in FIG. 1 are merely illustrative. Any number of user clients, node servers, and source station servers may be provided based on actual requirements.

Further referring to FIG. 2, a process 200 of a method for determining an access path of a content delivery network according to an embodiment of the present disclosure is shown. The method for determining an access path of a content delivery network includes the following steps.

Step 201: acquiring, in response to determining that an edge node receiving a user request fails to cache a requested resource, access performance information of each node in the content delivery network.

A user may initiate a request for access to a resource of a target source station via a client. An edge node connected to the client in the content delivery network may receive the user request, and determine whether a cache of the edge node contains the resource requested for access. An executing body of the method for determining an access path of a content delivery network may acquire, in response to determining that an edge node connected to the client fails to cache the requested resource, access performance information of each node in the content delivery network.

The edge node may be a preset node for direct interaction with the client. The edge node in the content delivery network may cache a part of resources, to quickly provide resources to the user. If the edge node does not cache a resource requested by the user, then the resource needs to be acquired by accessing to a server of the target source station via the content delivery network.

The access performance information of each node acquired by the executing body may be information characterizing inter-node network communication performance. For example, the access performance information includes one or more of following items: an inter-node distance, an available state of nodes, an inter-node communication efficiency, an inter-node communication cost, an inter-node message delay, an available bandwidth of nodes, or the like. The executing body may pre-collect the access performance information of communication between each node and other nodes, and establish an access performance information table. Alternatively, the content delivery network may include a communication state monitoring module configured to plan a request forwarding path. The communication state monitoring module may be deployed at one or more nodes in the content delivery network. The communication state monitoring module may collect the access performance information between each node and other nodes in the content delivery network. The executing body may acquire the access performance information between each node and other nodes collected by the communication state monitoring module through communicating with the communication state monitoring module.

Step 202: determining a target path from the edge node receiving the user request via a preset node corresponding to a requested target source station in the content delivery network to the target source station based on the access performance information of the each node in the content delivery network.

In the present embodiment, a path from the edge node receiving the user request via the preset node connected to the requested target source station to the target source station may be found based on the acquired access performance information of communication between each node and other nodes in the content delivery network. The preset node pre-establishes a connection with the requested target source station, a distance between the preset node and the target source station meets a preset distance condition, and the preset node is arranged in correspondence to the target source station.

In practice, a node closest to the target source station in the content delivery network may be preset for use as a preset node corresponding to the target source station. Preset nodes corresponding to different source stations with servers at different geographical locations may also be different. For example, servers of source stations a and b are in Beijing and Shanghai respectively, and preset nodes corresponding to the servers are arranged in North China and East China respectively. All requests for a given source station are forwarded to preset nodes corresponding to the given source station for return to the source station.

Here, the target source station is a source station providing the resource requested by the user. The server of the target source station may be deployed in a region far away from the edge node receiving the user request. The user request may be forwarded to the target source station using the nodes in the content delivery network as relay nodes.

A preset node corresponding to the target source station may be first found in the content delivery network, then a path from the edge node to the preset node corresponding to the target source station is planned based on the access performance information of the node in the content delivery network acquired in step 201, and then the target path from the edge node to the target source station is determined along the path.

During the path planning, a plurality of candidate paths may be first determined, the candidate paths are paths reaching the target source station via at least one node in the content delivery network, and then an overall access performance index of the candidate paths is determined based on the access performance information of each node on the candidate paths. As an example, a candidate path reaches the target source station via a node A (edge node), a node B, and a node C, and then the overall access performance index may be determined based on access performance information from the node A to the node B, and access performance information from the node B to the node C. For example, overall delay is delay from the node A to the node B+delay from the node B to the node C+delay from the node C to the target source station. A candidate path with best overall access performance may be selected for use as the target path.

Alternatively, the access performance information may include at least one item of delay information, availability information, or node load information, and at least one item of available bandwidth, or cost per unit of data traffic. The delay information, the availability information, and the node load information are information characterizing the communication quality of the nodes, and the available bandwidth, and the cost per unit of data traffic are information characterizing costs generated by access via the nodes. The delay information is time difference information of transferring a message between the nodes and other nodes, the availability information is current communication state information of the nodes, and the node load information may include CPU load information of the nodes, I/O (input/output) speed of the network card, and the like. The available bandwidth is bandwidth available for the nodes, and the cost per unit of data traffic is time and/or cost information spent by the nodes in transferring a unit of data traffic.

Thus, path planning may be performed based on the access performance in the aspects of both node quality and cost. Specifically, weighted summing on scores of the delay information, the availability information, and the node load information characterizing the quality and scores of the available bandwidth and the cost per unit of data traffic characterizing the cost may be performed to obtain scores of the candidate paths, and then a candidate path with a highest score may be selected for use as the target path. Here, the shorter is the delay, the higher is the availability, the fewer are the loads, the greater is the available bandwidth, the lower is the cost per unit of data traffic, and the higher is the corresponding score.

The executing body may further establish a directed graph based on the access performance information of the nodes, and execute the above target path searching using a dijkstra algorithm.

The method for determining an access path of a content delivery network in the above embodiments of the present disclosure acquires, in response to determining that an edge node receiving a user request fails to cache a requested resource, access performance information of each node in the content delivery network, and then determines a target path from the edge node receiving the user request via a preset node corresponding to a requested target source station in the content delivery network to the target source station based on the access performance information of the each node in the content delivery network, where the preset node pre-establishes a connection with the requested target source station, and a distance between the preset node and the target source station meets a preset distance condition, thereby achieving returning to the source station once via the preset node corresponding to the target source station on the premise of ensuring the access performance, and improving the quality of return to the source station whist effectively converging and returning to the source station.

Referring to FIG. 3, a flowchart of the method for determining an access path of a content delivery network according to another embodiment of the present disclosure is shown. As shown in FIG. 3, a process 300 of the method for determining an access path of a content delivery network of the present embodiment includes the following steps.

Step 301: acquiring, in response to determining that an edge node receiving a user request fails to cache a requested resource, access performance information of each node in a content delivery network.

When determining a resource requested by a request for accessing to a target source station initiated by a user via a client not being cached in the edge node receiving the request, an executing body of the method for determining an access path of a content delivery network may acquire pre-collected access performance information of each node in the content delivery network.

Step 301 in the present embodiment is consistent with step 201 in the above embodiments. The specific implementations of step 301 may refer to above description of step 201, which will not be repeatedly described here.

Step 302: executing path searching with the edge node receiving the user request as a starting point of a determined path segment, and the fringe node receiving the user request as a starting current node.

When determining the edge node receiving the user request failing to cache the requested resource in step 301, a path from the edge node via a preset node corresponding to a requested target source station to the target source station may be planned. Specifically, a path from the edge node to the preset node corresponding to the target source station may be planned. During the path planning, a directed graph may be established based on the acquired access performance information between nodes, a distance between two nodes in the directed graph is characterized using the access performance information, and then a shortest path is planned based on the directed graph.

First, three nodes on a target path may be determined: the edge node as a starting point of the path, the target source station as an end point of the path, the preset node corresponding to the target source station as a last node before the end point. Then, a path from the starting point to the last node before the end point is planned. Specifically, the target path may be formed by connecting nodes with the access performance information meeting the preset condition sequentially on the basis of the starting point. The path searching may be executed with the edge node as the starting current node.

The path searching specifically includes step 3021, step 3022, and step 3023.

Step 3021: selecting a node with access performance information meeting a preset performance condition and not being on the determined path segment from nodes connected to the current node for use as a next node of a current node, and connecting the next node of the current node to the determined path segment.

The preset performance condition may be a pre-established performance condition. Alternatively, a node meeting the preset performance condition may be a node with best access performance. In practice, the access performance information may be quantified, and ranked based on quantified values. The first-ranked node is the node meeting the preset performance condition.

The determined path segment is a path segment formed by connecting determined nodes with the access performance information meeting the preset performance condition sequentially from the starting point. For example, the starting point is S0, a node S1 with access performance information meeting the preset performance condition is determined based on the starting point S0, and then S0 and S1 are connected to form the determined path segment. When searching for a next node of S1, the next node may be searched for from nodes except for all of the nodes on the determined path segment. S2 is searched, and then S2 is connected to the determined path segment to form a determined path segment S0-S1-S2.

Step 3022: determining whether the next node of the current node is a preset node corresponding to a requested target source station.

Step 3023: switching, in response to that the next node of the current node is not the preset node corresponding to the requested target source station, the next node of the current node to a new current node, and returning to execute the path searching.

If the next node of the searched current node is not the preset node corresponding to the target source station, then the path searching is not terminated, and needs to be continued. In this case, the next node searched based on the current node may be switched to the new current node, followed by returning to execute the step 3021 to step 3023. The path searching is stopped until the searched next node is the preset node corresponding to the target source station. Thus, nodes in the content delivery network may be connected sequentially by continuously executing the above path searching, to form the determined path segment.

Alternatively, the path searching may further include: combining an identifier of the current node into the user request. Specifically, a node identifier, such as an IP address, of the current node may be added to header information of a http request, such that the nodes on the determined path segment may be identified based on the user request during the path searching.

In this case, the next node of the current node may be determined as follows: determining a node on the determined path segment based on a node identifier contained in the user request received by the current node, and selecting a node not being on the determined path segment from the nodes connected to the current node and with the access performance information meeting the preset performance condition for use as the next node of the current node. During the path searching, the user request may be forwarded to the determined next node from the current node. The node on the determined path segment may be determined based on the node identifier contained in the user request. When searching for the next node of the current node, the next node of the current node is searched for from nodes not being on the determined path segment based on the node identifier contained in the user request. Thus, the node on the determined path segment may be determined by an approach "path memory", to ensure that a closed loop will not be formed between a plurality of nodes during the path searching.

The above process 300 of the method for determining an access path of a content delivery network further includes the following step.

Step 303: determining, in response to that the next node of the current node is the preset node corresponding to the requested target source station, a determined path segment formed by the connecting for use as a target path.

If the preset node corresponding to the target source station being connected is searched during the path searching, then the path searching may be stopped, and a currently determined path segment is determined for use as the above target path.

Figure 4:
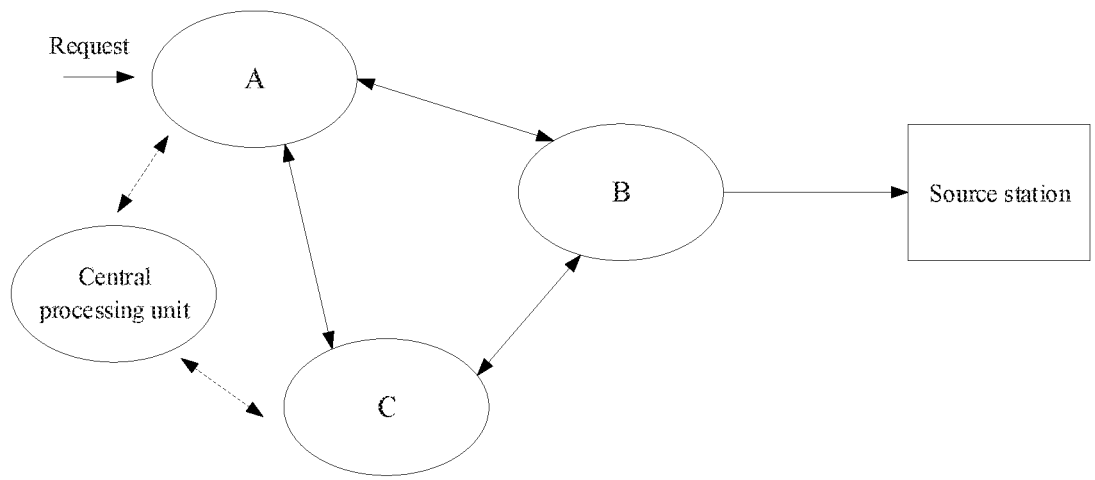
FIG. 4 is an exemplary architectural diagram of the content delivery network in the embodiment shown in FIG. 3.

FIG. 4 shows an exemplary architectural diagram of the content delivery network in the embodiment shown in FIG. 3. Taking a node A in FIG. 4 as an edge node receiving a user request as an example, Table 1 illustrates inter-node delay and availability data in the content delivery network.

TABLE 1

Inter-node Delay/Availability Data

| Delay/Availability | A | B | C | Source station |
|---|---|---|---|---|
| A | —/— | 50 ms/98% | 10 ms/98% | 60 ms/— |
| B | 20 ms/99% | —/— | 30 ms/99% | 50 ms/— |
| C | 30 ms/96% | 60 ms/99% | —/— | 20 ms/— |

For example, in Table 1, delay between the node A and a node B is 50 ms, availability data of communication between the node A and the node B are 98%, delay between the node A and a node C is 10 ms, and availability data of communication between the node A and the node C are 98%.

As shown in FIG. 4, after the node A receives the user request, the node C with shorter delay may be selected from the node B and the node C connected to the node A based on the above inter-node delay/availability data recorded in the "central processing unit" (i.e., the above communication state monitoring module), for use as the next node of the node A. Here, the central processing unit may be the communication state monitoring module deployed in the content delivery network. An identifier of the node A may be added to a request header of the user request, then the user request with the identifier of the node A is forwarded to the node C. Then, the node C will not consider the node A when finding the next node, but select the node B for use as the next node. Since the node B is connected to the source station, then a complete target path A→C→B→source station is found.

The above process 300 of the method for determining an access path of a content delivery network searches for a node with access performance information meeting a preset performance condition and not being on a determined path segment sequentially based on nodes on the determined path segment with an edge node receiving a user request as a starting point of a target path, for use as a next node, and stops path searching when a path segment is connected to a preset node corresponding to the target source station, thus ensuring that the searched path will not form a closed loop whilst searching a path with better access performance by imposing restrictions, i.e., the preset access performance condition.

Figure 5:
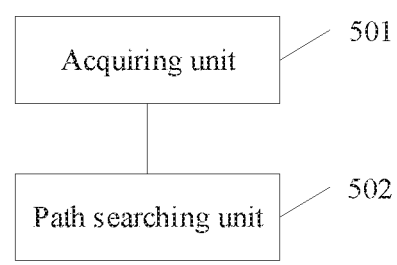
FIG. 5 is a schematic structural diagram of an apparatus for determining an access path of a content delivery network according to an embodiment of the present disclosure.

Further referring to FIG. 5, as an implementation of the method shown in the above figures, an embodiment of the present disclosure provides an apparatus for determining an access path of a content delivery network. The embodiment of the apparatus corresponds to the embodiment of the method shown in FIG. 2 and FIG. 3. The apparatus may be specifically applied to various electronic devices.

As shown in FIG. 5, the apparatus 500 for determining an access path of a content delivery network of the present embodiment includes: an acquiring unit 501, and a path searching unit 502. The acquiring unit 501 is configured to acquire, in response to determining that an edge node receiving a user request fails to cache a requested resource, access performance information of each node in the content delivery network; and the path searching unit 502 is configured to determine a target path from the edge node receiving the user request via a preset node corresponding to a requested target source station in the content delivery network to the target source station based on the access performance information of the each node in the content delivery network, where the preset node pre-establishes a connection with the requested target source station, and a distance between the preset node and the target source station meets a preset distance condition.

In some embodiments, the path searching unit 502 may be configured to determine a target path from the edge node receiving the user request via a preset node corresponding to a requested target source station in the content delivery network to the target source station as follows: executing following path searching with the edge node as a starting point of a determined path segment, and the edge node as a starting current node: selecting a node with access performance information meeting a preset performance condition and not being on the determined path segment from nodes connected to the current node for use as a next node of the current node, connecting the next node of the current node to the determined path segment, determining whether the next node of the current node is the preset node corresponding to the requested target source station, switching, in response to that the next node of the current node is not the preset node corresponding to the requested target source station, the next node of the current node to a new current node, and executing the path searching; and determining, in response to that the next node of the current node is the preset node corresponding to the requested target source station, a determined path segment formed by the connecting for use as the target path.

In some embodiments, the path searching unit 502 may be further configured to combine an identifier of the current node into the user request when performing the path searching.

In some embodiments, the path searching unit 502 may be further configured to select the node with the access performance information meeting the preset performance condition and not being on the determined path segment from nodes connected to the current node for use as a next node of the current node as follows: determining a node on the determined path segment based on a node identifier contained in the user request received by the current node, and selecting a node not being on the determined path segment from the nodes connected to the current node and with the access performance information meeting the preset performance condition for use as the next node of the current node.

In some embodiments, the access performance information includes: at least one item of delay information, availability information, or node load information, and at least one item of available bandwidth, or cost per unit of data traffic.

It should be understood that the units disclosed in the apparatus 500 correspond to the steps in the method described in FIG. 2 and FIG. 3. Therefore, the operations and features described above for the method also apply to the apparatus 500 and the units included therein, which will not be repeatedly described here.

The apparatus for determining an access path of a content delivery network in the above embodiments of the present disclosure acquires, in response to determining that an edge node receiving a user request fails to cache a requested resource, access performance information of each node in the content delivery network, and determines a target path from the edge node receiving the user request via a preset node corresponding to a requested target source station in the content delivery network to the target source station based on the access performance information of the each node in the content delivery network, where the preset node pre-establishes a connection with the requested target source station, and a distance between the preset node and the target source station meets a preset distance condition, thereby achieving returning to the source station once via the preset node corresponding to the target source station on the premise of ensuring the access performance, and contributing to improving the quality of return to the source station.

Figure 6:
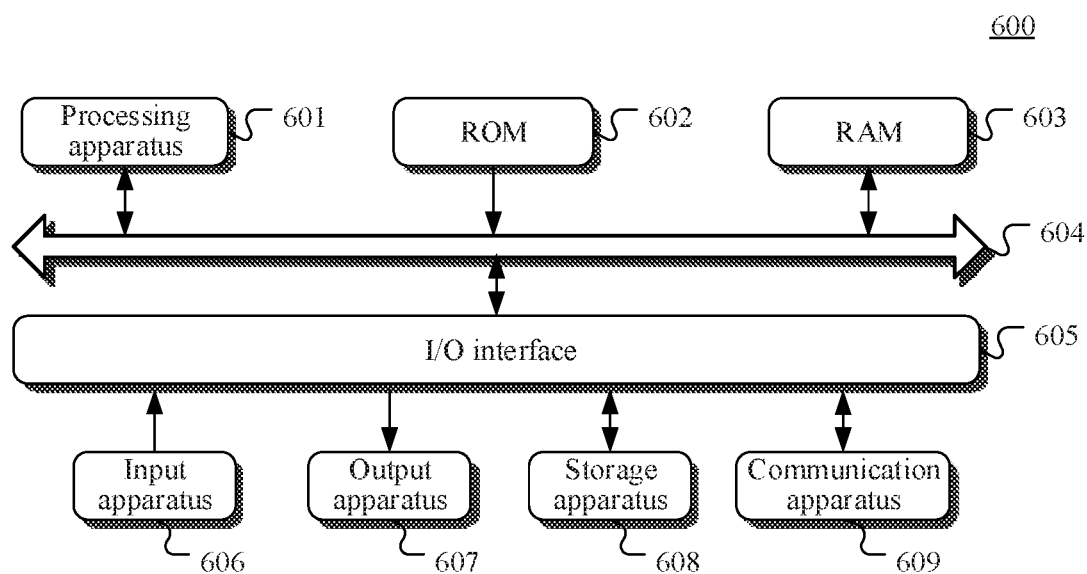
FIG. 6 is a schematic structural diagram of a computer system adapted to implement an electronic device of the embodiments of the present disclosure.

Referring to FIG. 6 below, a schematic structural diagram of an electronic device (e.g., the node server in FIG. 1) 600 adapted to implement the embodiments of the present disclosure is shown. The server shown in FIG. 6 is merely an example, and should not limit the functions and scope of use of the embodiments of the present disclosure.

As shown in FIG. 6, the electronic device 600 may include a processing apparatus (e.g., a central processing unit, or a graphics processor) 601, which may execute various appropriate actions and processes in accordance with a program stored in a read only memory (ROM) 602 or a program loaded into a random access memory (RAM) 603 from a storage apparatus 608. The RAM 603 further stores various programs and data required by operations of the electronic device 600. The processing apparatus 601, the ROM 602, and the RAM 603 are connected to each other through a bus 604. An input/output (I/O) interface 605 is also connected to the bus 604.

The following apparatuses may be connected to the I/O interface 605: an input apparatus 606 including a touch screen, a touch pad, a keyboard, a mouse, a camera, a microphone, an accelerometer, a gyroscope, or the like; an output apparatus 607 including a liquid crystal displayer (LCD), a speaker, a vibrator, or the like; a storage apparatus 608 including a hard disk, or the like; and a communication apparatus 609. The communication apparatus 609 may allow the electronic device 600 to exchange data with other devices through wireless or wired communication. While FIG. 6 shows the electronic device 600 having various apparatuses, it should be understood that it is not necessary to implement or provide all of the units shown in the figure. More or fewer units may be alternatively implemented or provided. Each block shown in FIG. 6 may represent an apparatus, or represent a plurality of apparatuses as required.

In particular, according to the embodiments of the present disclosure, the process described above with reference to the flow chart may be implemented in a computer software program. For example, an embodiment of the present disclosure includes a computer program product, which includes a computer program that is tangibly embedded in a computer readable medium. The computer program includes program codes for executing the method illustrated in the flow chart. In such an embodiment, the computer program may be downloaded and installed from a network via the communication apparatus 609, or be installed from the storage apparatus 608, or be installed from the ROM 602. The computer program, when executed by the processing unit 601, implements the above functions as defined by the method of the embodiments of the present disclosure. It should be noted that the computer readable medium according to the embodiments of the present disclosure may be a computer readable signal medium or a computer readable storage medium, or any combination of the above two. An example of the computer readable storage medium may include, but is not limited to: electric, magnetic, optical, electromagnetic, infrared, or semiconductor systems, apparatuses, elements, or a combination of any of the above. A more specific example of the computer readable storage medium may include, but is not limited to: an electrical connection with one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination of the above. In the embodiments of the present disclosure, the computer readable storage medium may be any tangible medium containing or storing programs which may be used by, or used in combination with, a command execution system, apparatus or element. In the embodiments of the present disclosure, the computer readable signal medium may include a data signal in the base band or propagating as parts of a carrier wave, in which computer readable program codes are carried. The propagating data signal may take various forms, including but not limited to an electromagnetic signal, an optical signal, or any suitable combination of the above. The computer readable signal medium may further be any computer readable medium except for the computer readable storage medium. The computer readable signal medium is capable of transmitting, propagating or transferring programs for use by, or used in combination with, a command execution system, apparatus or element. The program codes contained on the computer readable medium may be transmitted with any suitable medium, including but not limited to: wire, an optical cable, a RF (radio frequency) medium etc., or any suitable combination of the above.

The computer readable medium may be included in the above electronic device; or a stand-alone computer readable medium without being assembled into the electronic device. The computer readable medium stores one or more programs. The one or more programs, when executed by the electronic device, cause the electronic device to: acquire, in response to determining that an edge node receiving a user request fails to cache a requested resource, access performance information of each node in the content delivery network; and determine a target path from the edge node receiving the user request via a preset node corresponding to a requested target source station in the content delivery network to the target source station based on the access performance information of the each node in the content delivery network, where the preset node pre-establishes a connection with the requested target source station, and a distance between the preset node and the target source station meets a preset distance condition.

A computer program code for executing operations in the embodiments of the present disclosure may be compiled using one or more programming languages or combinations thereof. The programming languages include object-oriented programming languages, such as Java, Smalltalk or C++, and also include conventional procedural programming languages, such as "C" language, or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer via any network, including local area network (LAN) or wide area network (WAN), or may be connected to an external computer (for example, connected via the Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flowcharts or block diagrams may represent a module, a program segment, or a code portion, said module, program segment, or code portion including one or more executable instructions for implementing specified logical functions. It should be further noted that, in some alternative implementations, the functions denoted by the blocks may also occur in a sequence different from the sequences shown in the figures. For example, any two blocks presented in succession may be executed substantially in parallel, or they may sometimes be executed in a reverse sequence, depending on the functions involved. It should be further noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The units involved in the embodiments of the present disclosure may be implemented by software or hardware. The described units may also be provided in a processor, for example, described as: a processor including an acquiring unit, and a path searching unit. The names of the units do not constitute a limitation to such units themselves in some cases. For example, the first acquiring unit may be further described as "a unit for acquiring, in response to determining that an edge node receiving a user request fails to cache a requested resource, access performance information of each node in the content delivery network."

The above description only provides explanation of the preferred embodiments and the employed technical principles of the present disclosure. It should be appreciated by those skilled in the art that the inventive scope of the present disclosure is not limited to the technical solutions formed by the particular combinations of the above-described technical features. The inventive scope should also cover other technical solutions formed by any combination of the above-described technical features or equivalent features thereof without departing from the inventive concept of the present disclosure, for example, technical solutions formed by interchanging the above-described features with, but not limited to, technical features with similar functions disclosed in the present disclosure.

What is claimed is:

1. A method for determining an access path of a content delivery network, applied to a node server, comprising:
   acquiring, in response to determining that an edge node receiving a user request fails to cache a requested resource, access performance information of each node in the content delivery network; and
   executing following path searching with the edge node as a starting point of a path segment, and with the edge node as a current node: combining an identifier of the current node into the user request selecting, from nodes connected to the current node, a node for use as a next node of the current node, wherein the selected node has access performance information meeting a preset performance condition and an identifier of the selected node has not been combined into the user request connecting the next node of the current node to the path segment, and transmitting the user request to the next node of the current node; determining whether the next node of the current node is a preset node corresponding to the requested target source station, wherein the preset node pre-establishes a connection with the requested target source station, and a distance between the preset node and the target source station meets a preset distance condition; in response to determining that the next node of the current node is not the preset node corresponding to the requested target source station, switching the next node of the current node as a new current node to continue to execute the path searching; and determining, in response to determining that the next node of the current node is the preset node corresponding to the requested target source station, the path segment formed by the connecting as the target path.

2. The method according to claim 1, wherein the access performance information of each node in the content delivery network is acquired from an access performance information table maintained on a communication state monitoring module.

3. The method according to claim 1, wherein the selecting a node with access performance information meeting a preset performance condition and not being on the path segment from nodes connected to the current node for use as a next node of the current node comprises:

determining a node on the path segment based on a node identifier contained in the user request received by the current node, and selecting a node not being on the path segment from the nodes connected to the current node and with the access performance information meeting the preset performance condition for use as the next node of the current node.

4. The method according to claim 1, wherein the access performance information comprises:

at least one item of delay information, availability information, or node load information, and at least one item of available bandwidth, or cost per unit of data traffic.

5. The apparatus according to claim 1, wherein the selecting a node with access performance information meeting a preset performance condition and not being on the path segment from nodes connected to the current node for use as a next node of the current node comprises:

determining a node on the path segment based on a node identifier contained in the user request received by the current node, and selecting a node not being on the path segment from the nodes connected to the current node and with the access performance information meeting the preset performance condition for use as the next node of the current node.

6. The method according to claim 1, wherein the identifier is an Internet Protocol (IP) address and the user request is a Hyper Text Transfer Protocol (http) request, the combining an identifier of the current node into the user request comprises:

adding the IP address of the current node to the header of http request.

7. An apparatus for determining an access path of a content delivery network, comprising:

at least one processor; and a memory storing instructions, wherein the instructions when executed by the at least one processor, cause the at least one processor to perform operations, the operations comprising:

acquiring, in response to determining that an edge node receiving a user request fails to cache a requested resource, access performance information of each node in the content delivery network; and executing following path searching with the edge node as a starting point of a path segment, and with the edge node as a current node: combining an identifier of the current node into the user request selecting, from nodes connected to the current node, a node for use as a next node of the current node, wherein the selected node has access performance information meeting a preset performance condition and an identifier of the selected node has not been combined into the user request connecting the next node of the current node to the path segment, and transmitting the user request to the next node of the current node; determining whether the next node of the current node is a preset node corresponding to the requested target source station, wherein the preset node pre-establishes a connection with the requested target source station, and a distance between the preset node and the target source station meets a preset distance condition; in response to determining that the next node of the current node is not the preset node corresponding to the requested target source station, switching the next node of the current node as a new current node to continue to execute the path searching; and determining, in response to determining that the next node of the current node is the preset node corresponding to the requested target source station, the path segment formed by the connecting as the target path.

8. The apparatus according to claim 7, wherein the access performance information of each node in the content delivery network is acquired from an access performance information table maintained on a communication state monitoring module.

9. The apparatus according to claim 7, wherein the access performance information comprises:

at least one item of delay information, availability information, or node load information, and at least one item of available bandwidth, or cost per unit of data traffic.

10. A non-transitory computer readable medium, storing a computer program thereon, wherein the program, when executed by a processor, cause the processor to perform operations, the operations comprising:

acquiring, in response to determining that an edge node receiving a user request fails to cache a requested resource, access performance information of each node in the content delivery network from an access performance information table maintained on a communication state monitoring module; and executing following path searching with the edge node as a starting point of a path segment, and with the edge node as a current node: combining an identifier of the current node into the user request selecting, from nodes connected to the current node, a node for use as a next node of the current node, wherein the selected node has access performance information meeting a preset performance condition and an identifier of the selected node has not been combined into the user request connecting the next node of the current node to the path segment, and transmitting the user request to the next node of the current node; determining whether the next node of the current node is a preset node corresponding to the requested target source station, wherein the preset node pre-establishes a connection with the requested target source station, and a distance between the preset node and the target source station meets a preset distance condition; in response to determining that the next node of the current node is not the preset node corresponding to the requested target source station, switching the next node of the current node as a new current node to continue to execute the path searching; and determining, in response to determining that the next node of the current node is the preset node corresponding to the requested target source station, the path segment formed by the connecting as the target path.

11. The non-transitory computer readable medium according to claim 10, wherein the access performance information of each node in the content delivery network is acquired from an access performance information table maintained on a communication state monitoring module.

12. The non-transitory computer readable medium according to claim 10, wherein the selecting a node with access performance information meeting a preset performance condition and not being on the path segment from nodes connected to the current node for use as a next node of the current node comprises:
   determining a node on the path segment based on a node identifier contained in the user request received by the current node, and selecting a node not being on the path segment from the nodes connected to the current node and with the access performance information meeting the preset performance condition for use as the next node of the current node.

13. The non-transitory computer readable medium according to claim 10, wherein the access performance information comprises:
   at least one item of delay information, availability information, or node load information, and
   at least one item of available bandwidth, or cost per unit of data traffic.

* * * * *

UNITED STATES PATENT AND TRADEMARK OFFICE
CERTIFICATE OF CORRECTION

PATENT NO. : 11,412,024 B2
APPLICATION NO. : 16/675810
DATED : August 9, 2022
INVENTOR(S) : Yongqiang Wu, Yixing Sun and Tai Wang It is certified that error appears in the above-identified patent and that said Letters Patent is hereby corrected as shown below:

In the Claims

At Column 14, Lines 56-57 (Claim 1, Lines 16-17), please delete "user request connecting the next node" and insert --user request; connecting the next node-- therefor.

At Column 16, Lines 2-3 (Claim 7, Lines 20-21), please delete "user request connecting the next node" and insert --user request; connecting the next node-- therefor.

At Column 16, Lines 51-52 (Claim 10, Lines 19-20), please delete "user request connecting the next node" and insert --user request; connecting the next node-- therefor.

Signed and Sealed this
Thirteenth Day of December, 2022

Katherine Kelly Vidal
*Director of the United States Patent and Trademark Office*